W. EDWARDS.
PACKING FOR MERCURY DASHPOTS.
APPLICATION FILED OCT 30, 1920.

1,421,767.

Patented July 4, 1922.
2 SHEETS—SHEET 1.

Inventor:
William Edwards
by Albert G. Davis
His Attorney.

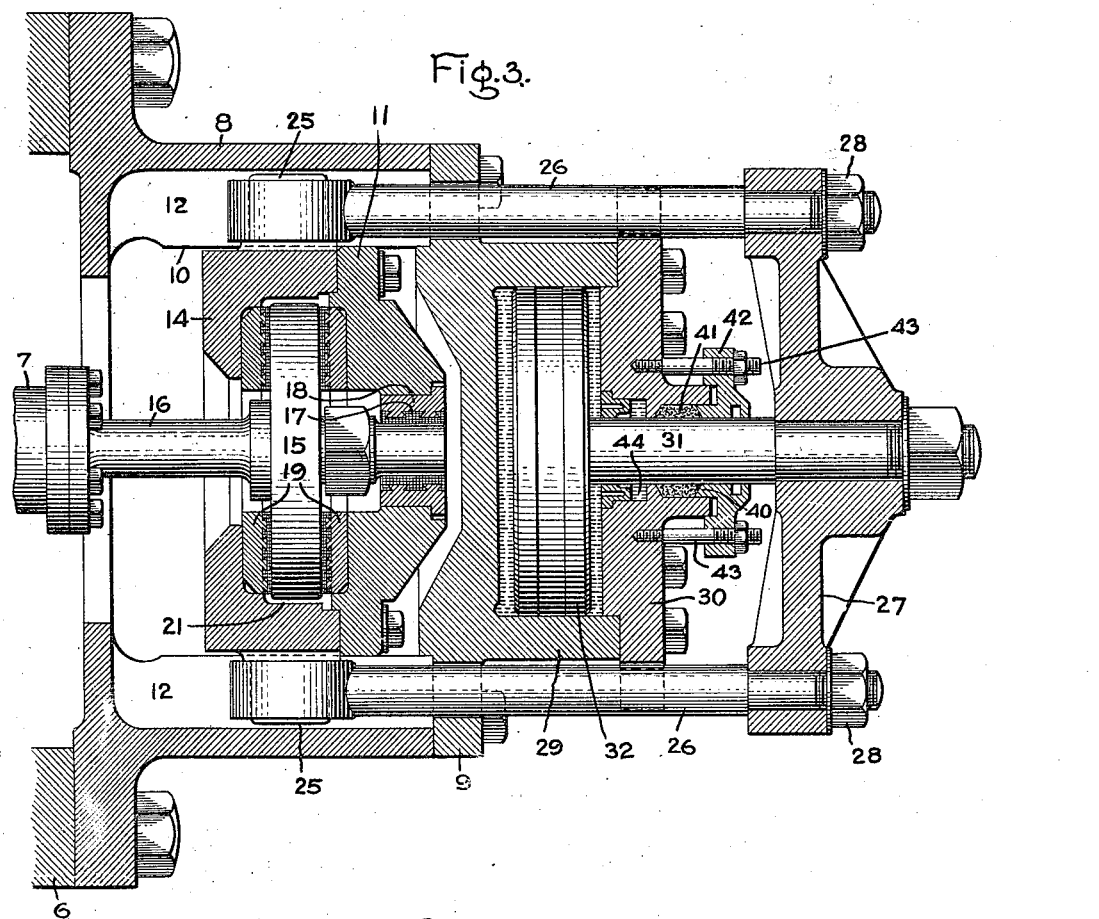
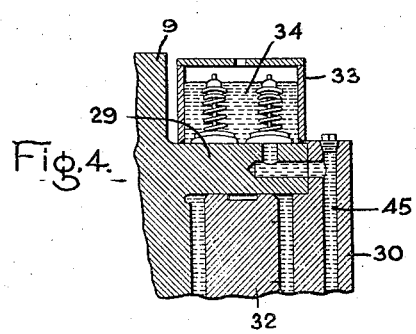

UNITED STATES PATENT OFFICE.

WILLIAM EDWARDS, OF SCHENECTADY, NEW YORK, ASSIGNOR TO GENERAL ELECTRIC COMPANY, A CORPORATION OF NEW YORK.

PACKING FOR MERCURY DASHPOTS.

1,421,767.   Specification of Letters Patent.   Patented July 4, 1922.

Application filed October 30, 1920. Serial No. 420,304.

*To all whom it may concern:*

Be it known that I, WILLIAM EDWARDS, a citizen of the United States, residing at Schenectady, in the county of Schenectady, State of New York, have invented certain new and useful Improvements in Packings for Mercury Dashpots, of which the following is a specification.

The present invention relates to vibration dampers such as are used in connection with elastic fluid turbines, the rotors of which may change their axial positions within the casing. It relates especially to vibration dampers intended for use in connection with turbines of the Ljungstrom type in which two blade elements or rotors are employed which rotate in opposite directions, the steam being admitted between the blade-carrying structures and flowing radially outward. Because of this arrangement of steam passage, an outward thrust is created on both rotors which is compensated for by axial thrust disks and packings. It is desirable to permit the rotors to slightly shift their axial positions with load changes but it is necessary that the shifting movements shall be rather slow since otherwise violent and sometimes destructive axial vibrations will be set up.

One type of vibration damper which has been found very efficient comprises a cylinder in which is located a piston having a rod projecting through the cylinder head, one of the elements being fixed and the other being connected to the rotor, the vibrations of which it is desired to dampen, there being a space in the cylinder on each side of the piston to which vibration dampening liquid, preferably mercury, is fed from a suitable tank. One of the serious problems in such a damper where a liquid is employed as a dampening medium, is to keep air out of the liquid because of its elasticity. If any appreciable amount is present it will seriously interfere with dampening action and when once axial vibrations start they build up rapidly and are difficult to stop.

The object of my invention is to provide an improved structure and arrangement of packing which will serve to prevent leakage of air around the rod which is connected to the piston and extends out through the cylinder head, and for a consideration of what I believe to be novel and my invention, attention is directed to the accompanying description and the claims appended thereto.

Figure 1:
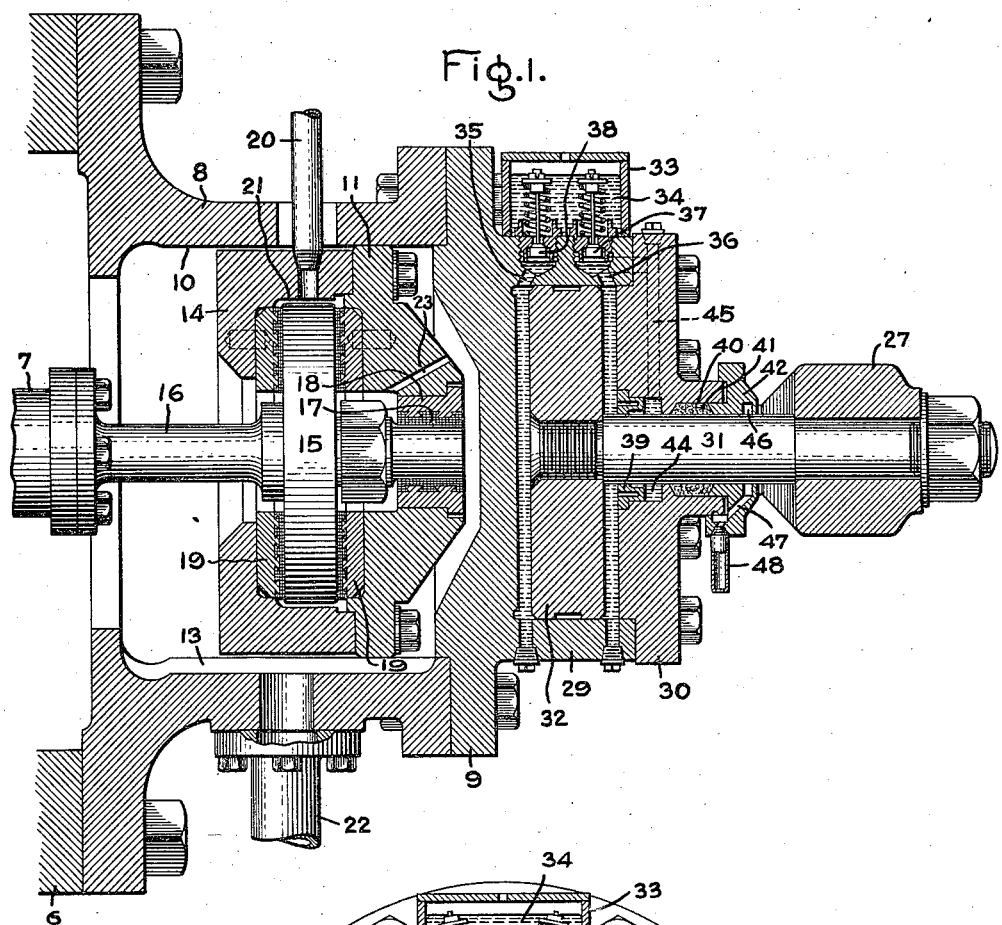
Figure 2:
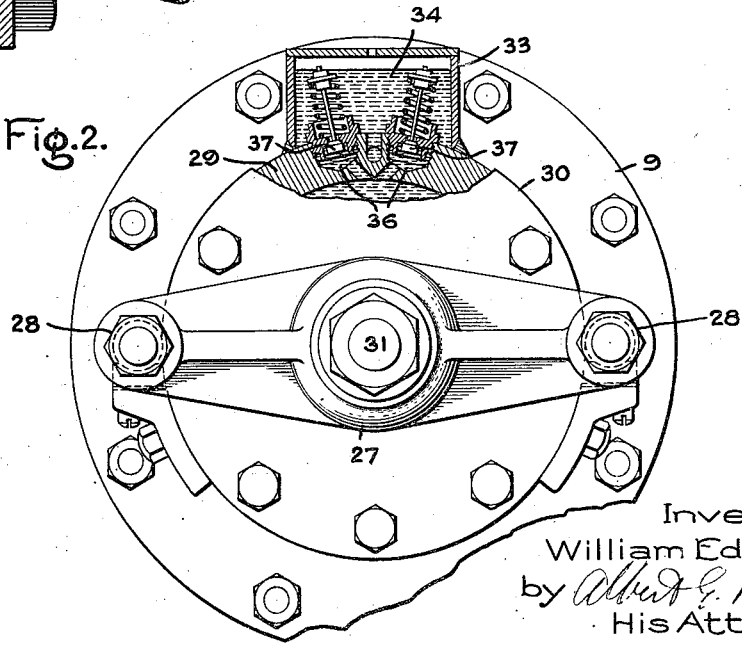

In the accompanying drawings which illustrate one of the embodiments of my invention, Fig. 1 is a vertical, axial, sectional view of a vibration damper; Fig. 2 is an end view of the same; Fig. 3 is a horizontal, axial section, and Fig. 4 is a detail view showing the mercury reservoir and passages leading thereto.

Referring to the drawing, 6 indicates a part which is secured to the turbine casing or associated part and 7 the turbine shaft or an extension thereof. In a Ljungstrom turbine, to which my invention is particularly adapted, the vibration damper is located at the end of the generator shaft, said generator shaft forming a continuation of the turbine shaft. In such a machine there are two rotors which revolve in opposite directions and each rotor is provided with a vibration damper, but as they are both alike only one is illustrated. 8 indicates a housing which is bolted to the part 6. The outer end of the housing is covered by a shouldered head 9 which is attached to the housing by bolts. This head serves as a means to separate the oil lubricating system from the mercury dashpot system and also forms a part of both systems as will appear later. The inside of the housing is bored to form a cylinder 10 in which is located a piston 11 forming part of a thrust bearing casing, said piston being arranged to move axially within the cylinder to a limited extent. The continuity of the cylinder wall is interrupted at two points to form recesses 12, Fig. 3, in which the casing trunnions move as will appear later. A recess 13 is also formed in the wall to collect lubricating oil. Attached to the piston by bolts is a ring 14 forming the other part of the casing, the two parts being shouldered together to hold them in concentric relation and relieve the bolts of shearing strains. Located within the piston is a round, hardened steel thrust disk 15 which is carried by an auxiliary shaft 16, the latter having a flange on its inner end which is bolted to a corresponding flange on the shaft 7. The outer end of the shaft 16 is located in a babbitt lined bearing 17 carried by a sleeve 18 which is seated in the piston part of the thrust casing. Located on opposite sides of the thrust disk are bearing disks 19 which are faced with babbitt. In the faces of the babbitt linings are oil grooves of usual construction. Lubricating oil is supplied to the thrust bearings by the pipe 20 which is tapped into the ring 14, there being a slot in the housing to permit the pipe to move axially with the thrust casing. Oil from the pipe enters the annular chamber 21 which surrounds the thrust disk and flows inwardly toward the axis of the shaft. The oil which lubricates the inner or left-hand side of the thrust disk flows freely through the enlarged opening around the shaft 16 into the cylinder and thence into the groove 13 which is in communication with the discharge pipe 22. The oil which flows through the right-hand side of the thrust bearing escapes by the passage 23 formed in the piston into the cylinder 10 and thence into the recess 13 and the discharge pipe 22. By arranging the passage 23 above the shaft and its bearing 17, a supply of lubricant to the latter is always insured. On opposite sides of the thrust casing are trunnions 25, Fig. 3, said trunnions being formed integral with the ring 14. These trunnions travel in the recesses 12 and are connected by connecting rods 26 with a yoke 27, the rods being secured to the yoke by nuts 28. The rods are guided toward their outer ends by guiding surfaces formed on the outer head of the dashpot piston, the purpose being to relieve the downward pressure on the stuffing box packing. By placing shims between the rods and guiding surfaces the proper alignment of parts can be obtained.

Formed on the outer face of head 9 is a cylinder 29 of a mercury dashpot. Secured to the outer end of the cylinder by bolts is a head 30 through which extends the rod 31 of the piston 32. Situated above the dashpot cylinder is a reservoir 33 which is nearly filled with a liquid 34, such as mercury, the arrangement being such that the liquid is supplied to the dashpot cylinder by gravity. The reservoir may have a direct opening to atmosphere through a small orifice or the cover may be loose enough so that air may seep in under its edges.

The reservoir is connected to the cylinder space on opposite sides of piston 32 by passages 35 and 36 in which are located inwardly opening spring-pressed valves 37 and 38.

In operation, as the piston moves within the cylinder a slow transfer of mercury takes place from one side of the piston to the other through the clearances between the piston and its cylinder, the spaces being kept filled at all times with mercury flowing, by gravity, past valves 37 and 38. Since valves 37 and 38 open inwardly, no flow can take place past them in the opposite direction, i. e., from the cylinder back to the reservoir.

The present invention relates particularly to a packing arrangement for preventing the leakage of air from the atmosphere to the mercury cylinder through the space surrounding rod 31. According to my invention, I provide in the cylinder head 30 between the surface of its opening and rod 31 two packings, an inner packing 39 and an outer packing 40. The inner packing is of the cup type, is made of metal, and is seated on a shoulder in the head. The inner part of the packing engages the rod 31. The purpose of making this packing cup shaped or U-shaped in cross section, is to insure the inner part of the packing hugging the shaft when the piston 32 moves outwardly or to the right, thereby increasing the fluid pressure of the cylinder on that side of the piston. The outer packing 40 is of the ordinary stuffing box type and comprises a body of packing material 41 and a gland 42 which can be adjusted by the bolts 43. Between the packings is an annular chamber 44 which is always in free communication with a vertically extending passage 45 shown in dotted lines in Fig. 1 and in full lines in Fig. 4. Passage 45 leads to the reservoir 33.

It will be seen that the annular chamber 44, passage 45 and reservoir 33 are all exposed to atmospheric pressure. As a result any liquid which may be forced out of cylinder 29 past packing 39 by a movement of piston 32 toward the right will enter the chamber 44 and flow upward through passage 45 to reservoir 33 because the resistance to flow will be very much less than that through packing 40. On the other hand, when piston 32 moves toward the left, if inner packing 39 should leak, permitting a flow through it from chamber 44, the chamber 44 will be kept filled with liquid being fed by gravity from reservoir 33 through passage 45 to it. As a result the packing means for rod 31 is most efficiently sealed against air entering through it and getting to the dashpot. In case any liquid should succeed in getting past packing 40 means are provided for catching it and to this end a chamber 46 is provided in gland 42 which chamber is connected by a small passage 47 to a receptacle 48 which is screw-threaded to the gland.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. A dashpot comprising a cylinder, a piston therein having a rod which extends through the cylinder head, a reservoir, conduits for conveying liquid from the reservoir to the cylinder, and means for preventing leakage of air around the rod comprising two spaced packings having an annular chamber between them, and means defining a conduit which connects the chamber to the reservoir.

2. The combination with a rotor subject to axial vibrations, of a thrust-absorbing means, a dashpot comprising a piston and cylinder, means connecting the piston with the thrust-absorbing means, packing means for the piston rod, a reservoir located above the cylinder and containing a liquid, and means forming an open passage connecting the reservoir with a region of the packing means and through which passage liquid is free to flow to the reservoir due to increase of cylinder pressure and is free to flow from the reservoir to the packing due to decrease of cylinder pressure.

3. The combination with a rotor shaft subject to axial vibrations, of a dashpot comprising a cylinder having a head, a piston having a rod which extends through said head, a reservoir open to atmosphere for supplying fluid by gravity to the cylinder on opposite sides of the piston, valve means between the reservoir and cylinder which open freely toward the cylinder, and a packing for the rod comprising two packing members having an annular chamber between them and a passage connecting said chamber to the reservoir.

In witness whereof, I have hereunto set my hand this 29th day of October, 1920.

WILLIAM EDWARDS.